(12) United States Patent
Inoue

(10) Patent No.: US 12,207,017 B2
(45) Date of Patent: Jan. 21, 2025

(54) VEHICULAR RECORDING CONTROL DEVICE, VEHICULAR CAPTURING APPARATUS, VEHICULAR RECORDING CONTROL METHOD, AND PROGRAM

(71) Applicant: JVCKENWOOD Corporation, Yokohama (JP)

(72) Inventor: Masaaki Inoue, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 88 days.

(21) Appl. No.: 17/412,322

(22) Filed: Aug. 26, 2021

(65) Prior Publication Data

US 2021/0385407 A1   Dec. 9, 2021

Related U.S. Application Data

(63) Continuation of application No. PCT/JP2019/045164, filed on Nov. 19, 2019.

(30) Foreign Application Priority Data

Mar. 8, 2019  (JP) ................................. 2019-042684

(51) Int. Cl.
*H04N 5/77* (2006.01)
*B60R 1/24* (2022.01)
(Continued)

(52) U.S. Cl.
CPC ................. *H04N 5/77* (2013.01); *B60R 1/24* (2022.01); *B60R 1/29* (2022.01); *H04N 7/18* (2013.01);
(Continued)

(58) Field of Classification Search
CPC . B60R 1/00; H04N 7/188; H04N 5/77; H04N 23/60; H04N 5/772; H04N 7/18
See application file for complete search history.

(56) References Cited

U.S. PATENT DOCUMENTS 7,088,387 B1 *  8/2006  Freeman ................ H04N 5/772
                                                386/E5.072
10,003,773 B2 *  6/2018  Jang ........................ H04N 23/69
(Continued)

FOREIGN PATENT DOCUMENTS

| JP | 2000-050251 | 2/2000 |
| JP | 2002-337752 | 11/2002 |
| JP | 2018-181043 | 11/2018 |

OTHER PUBLICATIONS

International Search Report and Written Opinion for International Application No. PCT/JP2019/045164 mailed on Jan. 21, 2020, 8 pages.
(Continued)

*Primary Examiner* — Boubacar Abdou Tchoussou
(74) *Attorney, Agent, or Firm* — Amin, Turocy & Watson, LLP

(57) ABSTRACT

A vehicular recording control device includes a capture-data acquisition unit configured to acquire capture data captured by a first capturing unit that captures a vicinity of a vehicle, an event detection unit configured to detect an event to the vehicle, a stop detection unit configured to detect a stop of the vehicle after the event detection unit detects the event, and a recording control unit configured to save, in a case where the event is detected by the event detection unit, as event record data, at least capture data corresponding to a first period resulting from the detection of the event.

9 Claims, 4 Drawing Sheets

(51) Int. Cl.
  *B60R 1/29*   (2022.01)
  *H04N 7/18*   (2006.01)
  *H04N 23/90*  (2023.01)
(52) U.S. Cl.
  CPC .......... *H04N 23/90* (2023.01); *B60R 2300/10* (2013.01); *B60R 2300/20* (2013.01)

(56) References Cited

U.S. PATENT DOCUMENTS

| | | | | |
|---|---|---|---|---|
| 10,931,912 | B2* | 2/2021 | Bostick | G06V 20/56 |
| 2002/0005895 | A1* | 1/2002 | Freeman | H04N 5/772 |
| | | | | 348/149 |
| 2010/0194549 | A1* | 8/2010 | Tonokawa | H04N 5/76 |
| | | | | 340/425.5 |
| 2014/0285337 | A1* | 9/2014 | Gebhardt | B60R 25/102 |
| | | | | 340/521 |
| 2017/0094231 | A1* | 3/2017 | Elkenkamp | H04N 5/77 |
| 2018/0211648 | A1 | 7/2018 | Nagai | |
| 2018/0316895 | A1 | 11/2018 | McClelland et al. | |
| 2020/0043260 | A1 | 2/2020 | Yamada et al. | |

OTHER PUBLICATIONS

Extended European Search Report for European Patent Application No. 19919401.0 dated Mar. 16, 2022.

* cited by examiner

VEHICULAR RECORDING CONTROL DEVICE, VEHICULAR CAPTURING APPARATUS, VEHICULAR RECORDING CONTROL METHOD, AND PROGRAM

CROSS-REFERENCE TO RELATED APPLICATION(S)

This application is a Continuation of PCT international application Ser. No. PCT/JP2019/045164 filed on Nov. 19, 2019 which designates the United States, incorporated herein by reference, and which claims the benefit of priority from Japanese Patent Application No. 2019-042684, filed on Mar. 8, 2019, incorporated herein by reference.

BACKGROUND

1. Technical Field

The present invention relates to a vehicular recording control device, a vehicular capturing apparatus, a vehicular recording control method, and a program.

2. Description of the Related Art

Known has been a technique of recording, in response to detection of occurrence of an event to a vehicle, capture data ranging from a time before the occurrence of the event to the time of the occurrence of the event (for example, refer to JP 2018-181043 A).

The drivers of vehicles each have a response duty at the time of occurrence of an accident. However, for minor accidents, for example, elderly people are particularly less likely to notice occurrence of such accidents. In addition, due to poor visibility resulting from, for example, night or bad weather, drivers are less likely to notice occurrence of accidents.

The present embodiment has been made in consideration of the above, and an object of the present embodiment is to achieve proper recording of an image at the time of occurrence of an event.

SUMMARY

To solve the above problem and achieve the above object, a vehicular recording control device according to a present embodiment includes a capture-data acquisition unit configured to acquire capture data captured by a first capturing unit that captures a vicinity of a vehicle, an event detection unit configured to detect an event to the vehicle, a stop detection unit configured to detect a stop of the vehicle after the event detection unit detects the event, and a recording control unit configured to save, in a case where the event is detected by the event detection unit, as event record data, at least capture data corresponding to a first period resulting from the detection of the event, the recording control unit being configured to save, in a case where no stop of the vehicle is detected by the stop detection unit in a second period after the detection of the event, as the event record data, capture data corresponding to a period until the stop detection unit detects the stop of the vehicle, in addition to the capture data corresponding to the first period.

A vehicular capturing apparatus according to a present embodiment includes the vehicular recording control device above, a first capturing unit configured to capture a vicinity of a vehicle; and a display unit configured to display capture data captured by the first capturing unit.

A vehicular recording control method according to a present embodiment includes a capture-data acquisition step of acquiring capture data captured by a first capturing unit that captures a vicinity of a vehicle, an event detection step of detecting an event to the vehicle, a stop detection step of detecting a stop of the vehicle after the event is detected in the event detection step, and a recording control step of saving, in a case where the event is detected in the event detection step, as event record data, at least capture data corresponding to a first period resulting from the detection of the event and saving, in a case where no stop of the vehicle is detected in the stop detection step in a second period after the detection of the event, as the event record data, capture data corresponding to a period until the stop of the vehicle is detected in the stop detection step, in addition to the capture data corresponding to the first period.

A non-transitory computer readable recording medium storing therein a program according to a present embodiment is disclosed. The program causes a computer that operates as a vehicular recording control device, to perform a capture-data acquisition step of acquiring capture data captured by a first capturing unit that captures a vicinity of a vehicle, an event detection step of detecting an event to the vehicle, a stop detection step of detecting a stop of the vehicle after the event is detected in the event detection step, and a recording control step of saving, in a case where the event is detected in the event detection step, as event record data, at least capture data corresponding to a first period resulting from the detection of the event and saving, in a case where no stop of the vehicle is detected in the stop detection step in a second period after the detection of the event, as the event record data, capture data corresponding to a period until the stop of the vehicle is detected in the stop detection step, in addition to the capture data corresponding to the first period.

DETAILED DESCRIPTION OF THE PREFERRED EMBODIMENTS

Embodiments of a vehicular recording control device, a vehicular capturing apparatus, a vehicular recording control method, and a program according to the present embodiment will be described in detail below with reference to the accompanying drawings. Note that the present invention is not limited to the following embodiments.

First Embodiment

Figure 1:
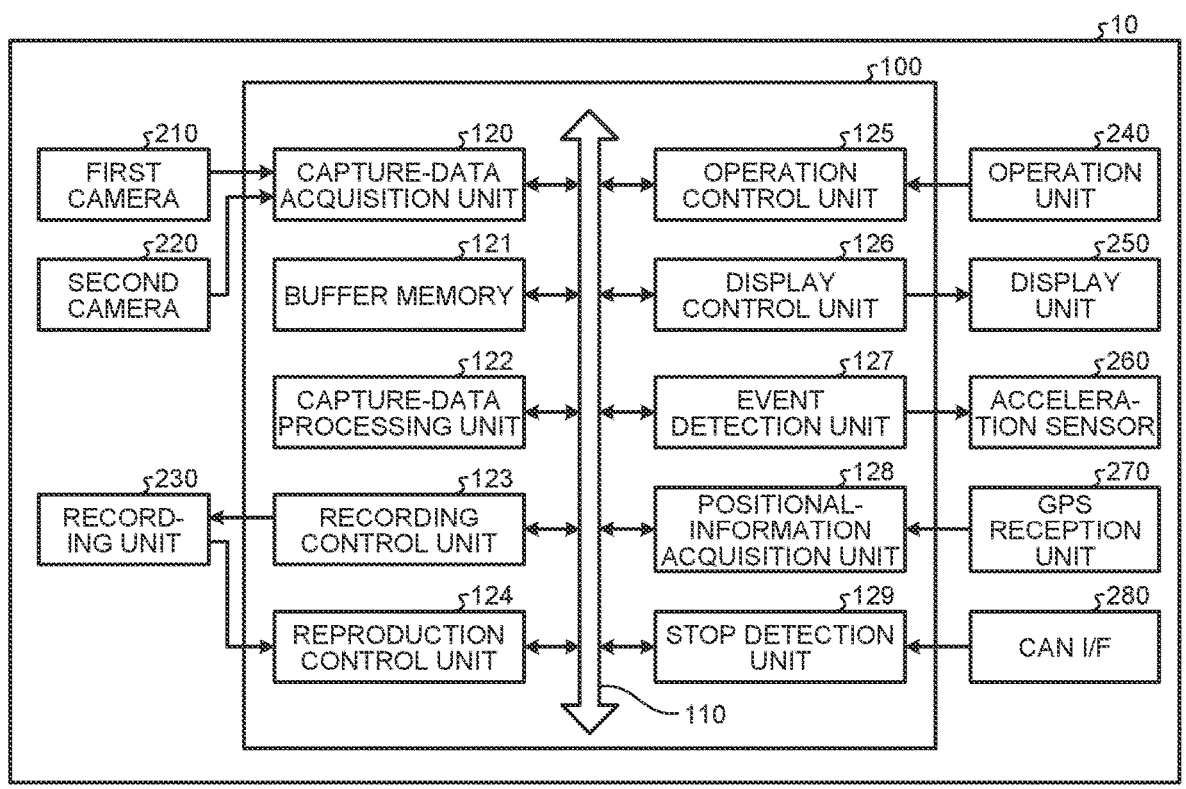
FIG. 1 is a block diagram of an exemplary configuration of a vehicular capturing apparatus according to a first embodiment.

FIG. 1 is a block diagram of an exemplary configuration of a vehicular capturing apparatus according to a first embodiment. A vehicular capturing apparatus 10 saves, in a case where an event is detected, as event record data, at least capture data corresponding to a first period resulting from the detection of the event and saves, in a case where no stop of the vehicle is detected in a second period after the detection of the event, as the event record data, capture data corresponding to the period until detection of a stop of the vehicle, in addition to the capture data corresponding to the first period.

The first period is, for example, approximately a period of 60 seconds that is the sum of respective periods of 30 seconds before and after detection of an event.

The second period is, for example, approximately a period of 30 seconds after detection of an event. The second period is a temporal margin for the vehicle to stop at a proper place after occurrence of an event. The second period may vary in accordance with the state of the driver, such as the age of the driver, the degree of proficiency in driving, or experience in driving. For example, the second period may be set shorter for an elderly person or a little experienced driver than for other drivers. Note that the state of the driver may be acquired, for example, from an electronic identification card enabling identification of the driver, an electronic key for the vehicle enabling identification of the driver, or setting information on in-vehicle equipment. The second period may vary in accordance with conditions at the time of driving, such as night and poor visibility. For example, the second period may be set shorter at night or at the time of poor visibility than normal. Note that conditions at the time of driving may be acquired from an external device through a communication network.

The vehicular capturing apparatus 10 is a so-called dashboard camera. The vehicular capturing apparatus 10 may be stationary in the vehicle or may be an apparatus mobile and utilizable in the vehicle. The vehicular capturing apparatus 10 includes a first camera (first capturing unit) 210, a second camera (second capturing unit) 220, a recording unit 230, an operation unit 240, a display unit 250, an acceleration sensor 260, a global positioning system (GPS) reception unit 270, a controller area network (CAN) interface unit 280, and a vehicular recording control device 100.

The first camera 210 captures the vicinity of the vehicle. For example, the first camera 210 is disposed at the front of the interior room of the vehicle such that forward capturing can be performed from the vehicle. The first camera 210 captures an image without discontinuity until the engine stops after starting, namely, while the vehicle is in operation. According to the present embodiment, the first camera 210 captures an image without discontinuity while the accessory power of the vehicle is ON. In response to detection of an event with the accessory power OFF, in other words, with the vehicle parked, the first camera 210 starts to capture an image. The first camera 210 outputs captured first capture data to a capture-data acquisition unit 120 in the vehicular recording control device 100. The first capture data is, for example, a moving image at 30 frames per second.

The second camera 220 captures a range including the driver of the vehicle. For example, the second camera 220 is disposed at the front of the interior room of the vehicle such that the interior room of the vehicle can be captured. The second camera 220 may capture an image without discontinuity until the engine stops after starting, namely, while the vehicle is in operation, or may start capturing as necessary. For capturing of an image without discontinuity, the second camera 220 captures an image without discontinuity while the accessory power of the vehicle is ON. In response to detection of an event with the accessory power OFF, in other words, with the vehicle parked, the second camera 220 starts to capture an image. The second camera 220 outputs captured second capture data to the capture-data acquisition unit 120 in the vehicular recording control device 100. The second capture data is, for example, a moving image at 30 frames per second. Even while the accessory power of the vehicle is ON, the second camera 220 may start to capture an image in response to detection of an event.

Unless otherwise specified, the first capture data and the second capture data will be given as capture data without distinction.

The recording unit 230 is used, for example, for temporary storage of data in the vehicular capturing apparatus 10. Examples of the recording unit 230 include semiconductor memory elements, such as a random access memory (RAM) and a flash memory, and a recording unit in a memory card. In addition, the recording unit 230 may be an external recording unit wirelessly connectable through a communication device not illustrated. The recording unit 230 records event record data or loop record data, on the basis of a control signal output from a recording control unit 123 in the vehicular recording control device 100.

The operation unit 240 is capable of receiving various types of operations to the vehicular capturing apparatus 10. For example, the operation unit 240 is capable of receiving an operation of saving captured capture data manually into the recording unit 230. For example, the operation unit 240 is capable of receiving an operation of reproducing the event record data or loop record data recorded in the recording unit 230. For example, the operation unit 240 is capable of receiving an operation of deleting the event record data recorded in the recording unit 230. For example, the operation unit 240 is capable of receiving an operation of terminating loop recording. The operation unit 240 outputs operation information to an operation control unit 125 in the vehicular recording control device 100.

Examples of the display unit 250 include a display device dedicated to the vehicular capturing apparatus 10 and a display device for use in a different system including a navigation system. The display unit 250 is a display, such as a liquid crystal display (LCD) or an organic electro-luminescence (EL) display. The display unit 250 displays an image, on the basis of an image signal output from a display control unit 126 in the vehicular recording control device 100. The display unit 250 displays the image being captured by the first camera 210, the image being captured by the second camera, or an image recorded in the recording unit 230.

The acceleration sensor 260 detects acceleration that the vehicle undergoes. The acceleration sensor 260 outputs a detection result to an event detection unit 127 in the vehicular recording control device 100. For example, the acceleration sensor 260 detects acceleration in triaxial directions. The triaxial directions are the longitudinal direction, lateral direction, and height direction of the vehicle. Acceleration in the triaxial directions enables detection of impact to the vehicle.

The GPS reception unit 270 receives a radio wave from a GPS satellite not illustrated. The GPS reception unit 270 outputs a signal resulting from the received radio wave, to a positional-information acquisition unit 128 in the vehicular recording control device 100.

The CAN interface unit 280 is an interface for acquisition of various types of vehicular information through a CAN. The vehicular information includes, for example, the operation condition of the engine and the travel condition of the vehicle.

The vehicular recording control device 100 is, for example, an arithmetic processing device (control device) including a central processing unit (CPU). The vehicular recording control device 100 loads a stored program into a memory and executes a command included in the program.

The vehicular recording control device 100 includes an internal memory not illustrated. The internal memory is used, for example, for temporary storage of data in the vehicular recording control device 100. The vehicular recording control device 100 includes the capture-data acquisition unit 120, a buffer memory 121, a capture-data processing unit 122, the recording control unit 123, a reproduction control unit 124, the operation control unit 125, the display control unit 126, the event detection unit 127, the positional-information acquisition unit 128, and a stop detection unit 129 that are connected to a bus 110.

The capture-data acquisition unit 120 acquires capture data including the captured vicinity of the vehicle. More specifically, the capture-data acquisition unit 120 acquires the capture data output from the first camera 210. The capture-data acquisition unit 120 may further acquire the capture data captured by the second camera 220 that captures a range including the driver of the vehicle. More specifically, the capture-data acquisition unit 120 acquires the capture data output from the second camera 220.

The buffer memory 121 is an internal memory included in the vehicular recording control device 100 and temporarily records a certain period of time's worth of capture data acquired by the capture-data acquisition unit 120, with updating.

The capture-data processing unit 122 converts the capture data temporarily stored in the buffer memory 121, into an appropriate file format, such as the format of MP4, coded by a codec in an appropriate mode, such as H.264 or Moving Picture Experts Group phase 4 (MPEG-4). The capture-data processing unit 122 generates a certain period of time's worth of capture data as a file from the capture data temporarily stored in the buffer memory 121. As a specific example, the capture-data processing unit 122 generates, as one file, a period of 60 seconds' worth of capture data in chronological record order from the capture data temporarily stored in the buffer memory 121. The capture-data processing unit 122 outputs the generated capture data to the recording control unit 123. Moreover, the capture-data processing unit 122 outputs the generated capture data to the display control unit 126. The period of capture data to be generated as a file is exemplarily 60 seconds, but is not limited to this. The capture data referred to herein may include sound in addition to the image.

The recording control unit 123 performs control such that the capture data converted to a file by the capture-data processing unit 122 is recorded in the recording unit 230. In the period of loop recording processing with the accessory power of the vehicle ON, the recording control unit 123 records, as overwritable capture data, the capture data converted to a file by the capture-data processing unit 122 into the recording unit 230. More specifically, in the period of loop recording processing, the recording control unit 123 continuously records the capture data generated by the capture-data processing unit 122 into the recording unit 230. In a case where the capacity of the recording unit 230 is full, recording is performed such that the oldest capture data is overwritten with new capture data.

In a case where an event is detected by the event detection unit 127, the recording control unit 123 saves, as no-overwriting-allowed event record data, capture data corresponding to a predetermined period in the capture data generated by the capture-data processing unit 122, into the recording unit 230.

In a case where an event is detected by the event detection unit 127, the recording control unit 123 saves, as event record data, at least capture data corresponding to the first period resulting from the detection of the event and saves, in a case where no stop of the vehicle is detected by the stop detection unit 129 in the second period after the detection of the event, as the event record data, capture data corresponding to the period until the stop detection unit 129 detects a stop of the vehicle, in addition to the capture data corresponding to the first period.

Furthermore, the recording control unit 123 may save the capture data corresponding to the period until the stop detection unit 129 detects a stop of the vehicle, for example, with regulation of at least a certain period's worth of deletion or into a region in which deletion is regulated.

In the period of loop recording processing, the capture data corresponding to the first period resulting from the detection of the event is capture data corresponding to a predetermined period centering on the point in time of the detection of the event. For example, the predetermined period centering on the point in time of the detection of the event ranges approximately from 10 to 60 seconds. In a case where capturing starts after detection of an event with no loop recording processing, the capture data corresponding to the first period resulting from the detection of the event is capture data corresponding to the period from a start of capturing after the detection of the event until the elapse of a predetermined period. For example, the predetermined period ranges approximately from 10 to 60 seconds.

The recording control unit 123 may save, as event record data, the capture data captured by the second camera 220, in addition to the capture data captured by the first camera 210. When the period from the detection of the event by the event detection unit 127 until detection of a stop of the vehicle by the stop detection unit 129 is defined as a third period, the recording control unit 123 may save, as the event record data, capture data captured by the second camera 220 and capture data captured by the first camera 210 both corresponding to the third period.

Preferably, the recording control unit 123 saves, as continuous event record data, the capture data corresponding to the first period and the capture data corresponding to the third period from the detection of the event by the event detection unit 127 until the detection of a stop of the vehicle by the stop detection unit 129.

The reproduction control unit 124 reproduces the selected event record data or loop record data. On the basis of respective control signals for a selection operation and a reproduction operation output from the operation control unit 125, the reproduction control unit 124 performs control such that the event record data or loop record data recorded in the recording unit 230 is reproduced.

In a case where no stop of the vehicle is detected by the stop detection unit 129 in the second period after the detection of the event by the event detection unit 127, the reproduction control unit 124 reproduces the event record data, in response to a stop of the vehicle after the second period elapses. The event record data to be reproduced here is the most recently saved event record data. The event record data to be reproduced here is the event record data corresponding to the first period. In a case where the event record data to be reproduced here includes the capture data captured by the first camera 210 and the capture data captured by the second camera 220, the capture data captured by the first camera 210 may be reproduced. The operation control unit 125 acquires operation information on an operation received by the operation unit 240. For example, the operation control unit 125 acquires save-operation information indicating a manual-save operation for capture data, selection-operation information indicating a selection operation for capture data, reproduction-operation information indicating a reproduction operation for capture data, or deletion-operation information indicating a deletion operation for capture data, and outputs a control signal. For example, the operation control unit 125 acquires termination-operation information indicating an operation of terminating loop recording, and outputs a control signal.

The display control unit 126 controls display of capture data in the display unit 250, on the basis of a control signal from the reproduction control unit 124. The display control unit 126 outputs an image signal that causes the display unit 250 to output capture data. More specifically, the display control unit 126 causes the display unit 250 to display the image being captured by the first camera 210, the image being captured by the second camera 220, or the event record data or loop record data recorded in the recording unit 230, each being reproduced by the reproduction control unit 124.

The event detection unit 127 detects an event to the vehicle. A method with which the event detection unit 127 detects an event to the vehicle is not limited. Exemplarily, the event detection unit 127 detects an event, on the basis of a detection result from the acceleration sensor 260. In this case, when the acceleration detected by the acceleration sensor 260 is a threshold or more, the event detection unit 127 detects an event. The threshold in acceleration is set such that impact to the vehicle is detected, so that the event detection unit 127 detects an event.

On the basis of the radio wave received by the GPS reception unit 270, the positional-information acquisition unit 128 calculates current positional information on the vehicle with a publicly known method. In a case where an event is detected by the event detection unit 127, the positional information calculated by the positional-information acquisition unit 128 is saved together with the event record data.

The stop detection unit 129 detects whether or not the vehicle remains stopped, on the basis of vehicular information acquired, for example, from the CAN interface unit 280 or from various types of sensors that sense the state of the vehicle. According to the present embodiment, the stop detection unit 129 acquires a stop of the vehicle after the event detection unit 127 detects an event. The vehicle remaining stopped is zero in vehicle speed. The stop detection unit 129 detects a stop state not allowing the vehicle immediately to start to travel, for example, a vehicle speed of zero and a power source, such as the engine of the vehicle, off, the gear in park position, or the parking brake in operation.

Figure 2:
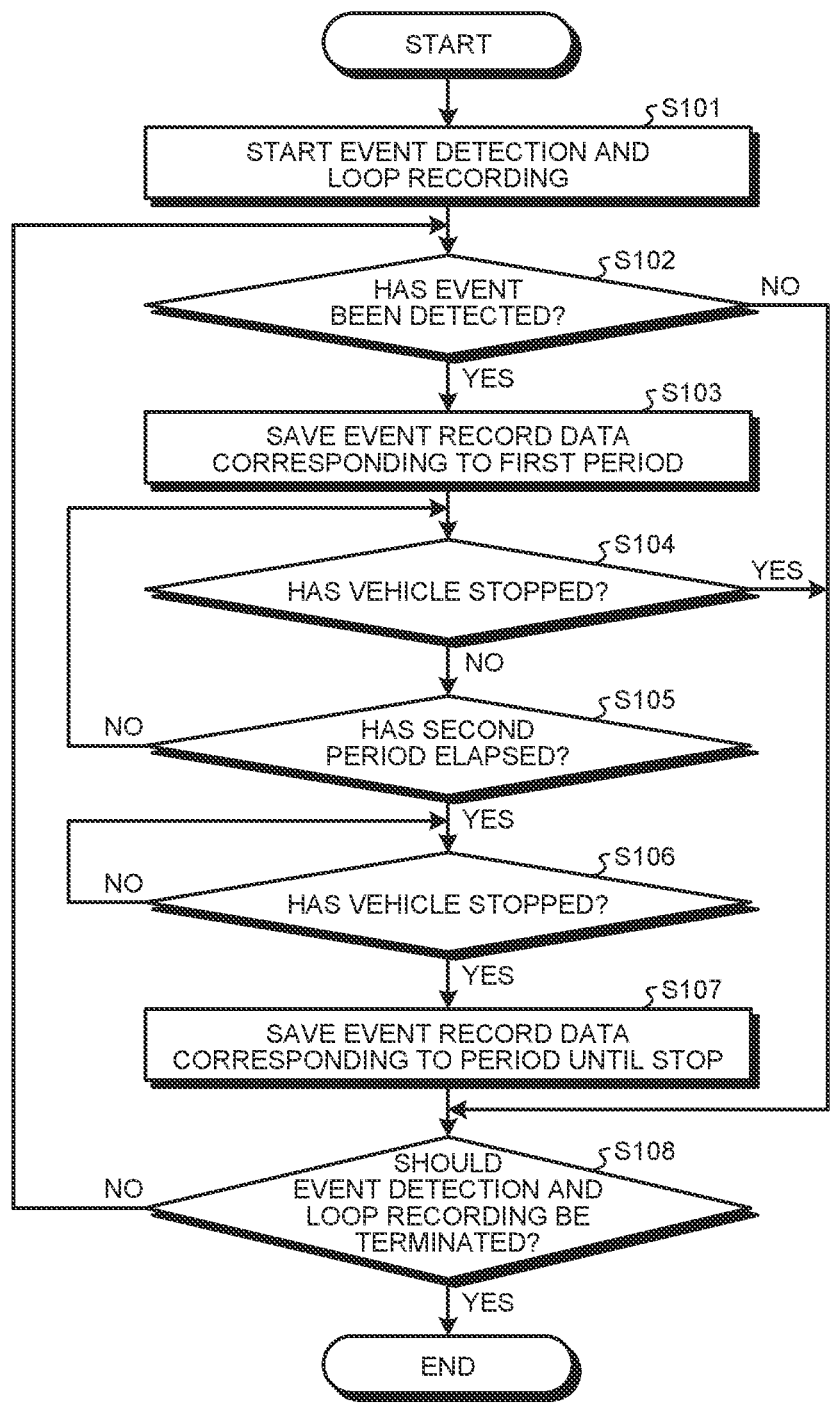
FIG. 2 is a flowchart of a flow of processing in a vehicular recording control device according to the first embodiment.

Next, a flow of processing in the vehicular recording control device 100 will be described with FIG. 2. FIG. 2 is a flowchart of a flow of processing in the vehicular recording control device according to the first embodiment. The case of loop recording processing will be given herein.

The vehicular recording control device 100 starts event detection and loop recording (Step S101). More specifically, the event detection unit 127 in the vehicular recording control device 100 detects an event, on the basis of a detection result from the acceleration sensor 260. The capture-data processing unit 122 in the vehicular recording control device 100 generates loop record capture data of each predetermined period's worth of image, from capture data recorded in the buffer memory 121. The recording control unit 123 in the vehicular recording control device 100 records the loop record capture data into the recording unit 230. The vehicular recording control device 100 proceeds to Step S102.

The event detection unit 127 in the vehicular recording control device 100 determines whether or not an event has been detected (Step S102). More specifically, in a case where an event is detected by the event detection unit 127 (Yes in Step S102), the vehicular recording control device 100 proceeds to Step S103. In a case where no event is detected by the event detection unit 127 (No in Step S102), the vehicular recording control device 100 proceeds to Step S108.

In a case where an event is detected (Yes in Step S102), the vehicular recording control device 100 saves event record data that is capture data corresponding to the first period centering on the time of the detection of the event (Step S102). More specifically, the capture-data processing unit 122 in the vehicular recording control device 100 generates, as event record data, at least the capture data corresponding to the first period including the point in time of occurrence of the event, from the loop record capture data recorded in the recording unit 230. The recording control unit 123 in the vehicular recording control device 100 records and saves the event record data into the recording unit 230. The vehicular recording control device 100 proceeds to Step S104.

The vehicular recording control device 100 determines whether the vehicle has stopped (Step S104). More specifically, in a case where the stop detection unit 129 determines that the vehicle has stopped (Yes in Step S104), the vehicular recording control device 100 proceeds to Step S108. A stop of the vehicle to be determined in Step S104 is preferably a stop state not allowing the vehicle immediately to start to travel. In this case, because of the stop of the vehicle in the second period after the detection of the event, it is conceivable that the driver has stopped the vehicle due to recognition of the occurrence of the event and is trying to deal with the event having occurred. In a case where the stop detection unit 129 determines that the vehicle has not stopped (No in Step S104), the vehicular recording control device 100 proceeds to Step S105.

The vehicular recording control device 100 determines whether or not the second period has elapsed (Step S105). More specifically, in a case where it is determined that the second period has elapsed (Yes in Step S105), the vehicular recording control device 100 proceeds to Step S106. In this case, because of no stop of the vehicle in the second period after the detection of the event, it is conceivable that the driver is continuing traveling without recognition of the occurrence of the event. In a case where it is determined that the second period has not elapsed (No in Step S105), the vehicular recording control device 100 performs the processing in Step S104, again.

The vehicular recording control device 100 determines whether the vehicle has stopped (Step S106). More specifically, in a case where the stop detection unit 129 determines that the vehicle has stopped (Yes in Step S106), the vehicular recording control device 100 proceeds to Step S107. A stop of the vehicle to be determined in Step S106 is zero in vehicle speed, and examples thereof include a stop due to a traffic light and a stop due to a stop sign. In a case where the stop detection unit 129 determines that the vehicle has not stopped (No in Step S106), the vehicular recording control device 100 performs the processing in Step S106, again.

The recording control unit 123 in the vehicular recording control device 100 saves event record data corresponding to the period until the stop of the vehicle determined in Step S106 (Step S107). The vehicular recording control device 100 proceeds to Step S108. The event record data saved in this case includes capture data corresponding to the period until the detection of the stop of the vehicle in Step S106 in addition to the capture data corresponding to the first period.

The vehicular recording control device 100 determines whether or not to terminate the event detection and loop recording (Step S108). More specifically, the vehicular recording control device 100 determines to terminate the event detection and loop recording, in response to termination-operation information output from the operation control unit 125 (Yes in Step S108) and then terminates the processing. Alternatively, termination of the operation or utilization of the vehicle causes termination of the event detection and loop recording. In a case where no termination-operation information is output from the operation control unit 125, the vehicular recording control device 100 determines not to terminate the event detection and loop recording (No in Step S108) and then performs the processing in Step S102, again.

As above, in a case where an event is detected, at least capture data corresponding to the first period resulting from the detection of the event is saved as event record data. In addition, in a case where no stop of the vehicle is detected in the second period after the detection of the event, capture data corresponding to the period until detection of a stop of the vehicle is saved as the event record data, in addition to the capture data corresponding to the first period.

As described above, according to the present embodiment, at least capture data corresponding to the first period resulting from detection of an event can be saved as event record data. In addition, in a case where no stop of the vehicle is detected in the second period after the detection of the event, capture data corresponding to the period until detection of a stop of the vehicle can be saved as the event record data, in addition to the capture data corresponding to the first period. According to the present embodiment, in a case where the driver has not noticed occurrence of an event, capture data corresponding to the period from detection of the event until detection of a stop of the vehicle can be saved as event record data. Thus, provided can be a basis for judgment of whether the driver had continued traveling without noticing the occurrence of the event or the driver had continued traveling intentionally in spite of noticing the occurrence of the event. As above, according to the present embodiment, capture data at the time of occurrence of an event can be properly recorded as event record data.

According to the present embodiment, the capture data captured by the second camera 220 can be saved as event record data, in addition to the capture data captured by the first camera 210. According to the present embodiment, as a video, recorded can be the state of the driver in a period centering on the time of detection of an event. This arrangement enables, for example, from the capture data, verification of whether the driver had not noticed the occurrence of the event, whether the driver had difficulty in noticing the event, or whether the driver had noticed the occurrence of the event.

In a case where the capture data captured by the second camera 220 is saved as event record data in addition to the capture data captured by the first camera 210, saved may be, as event record data, the capture data captured by the first camera 210 and the capture data captured by the second camera 220 both corresponding to the period until detection of a stop of the vehicle in Step S106 in addition to the first period. Alternatively, saved may be, as event record data, the capture data captured by the first camera corresponding to the period until detection of a stop of the vehicle in Step S106 in addition to the first period and the capture data captured by the second camera corresponding to the period from the detection of the event until detection of a stop of the vehicle in Step S106. The period from the detection of the event until detection of a stop of the vehicle in Step S106 is defined as a third period.

According to the present embodiment, capture data corresponding to the first period and capture data corresponding to the third period can be saved as continuous event record data. According to the present embodiment, the condition from the time of detection of an event until a stop of the vehicle can be recorded more properly.

Second Embodiment

Figure 3:
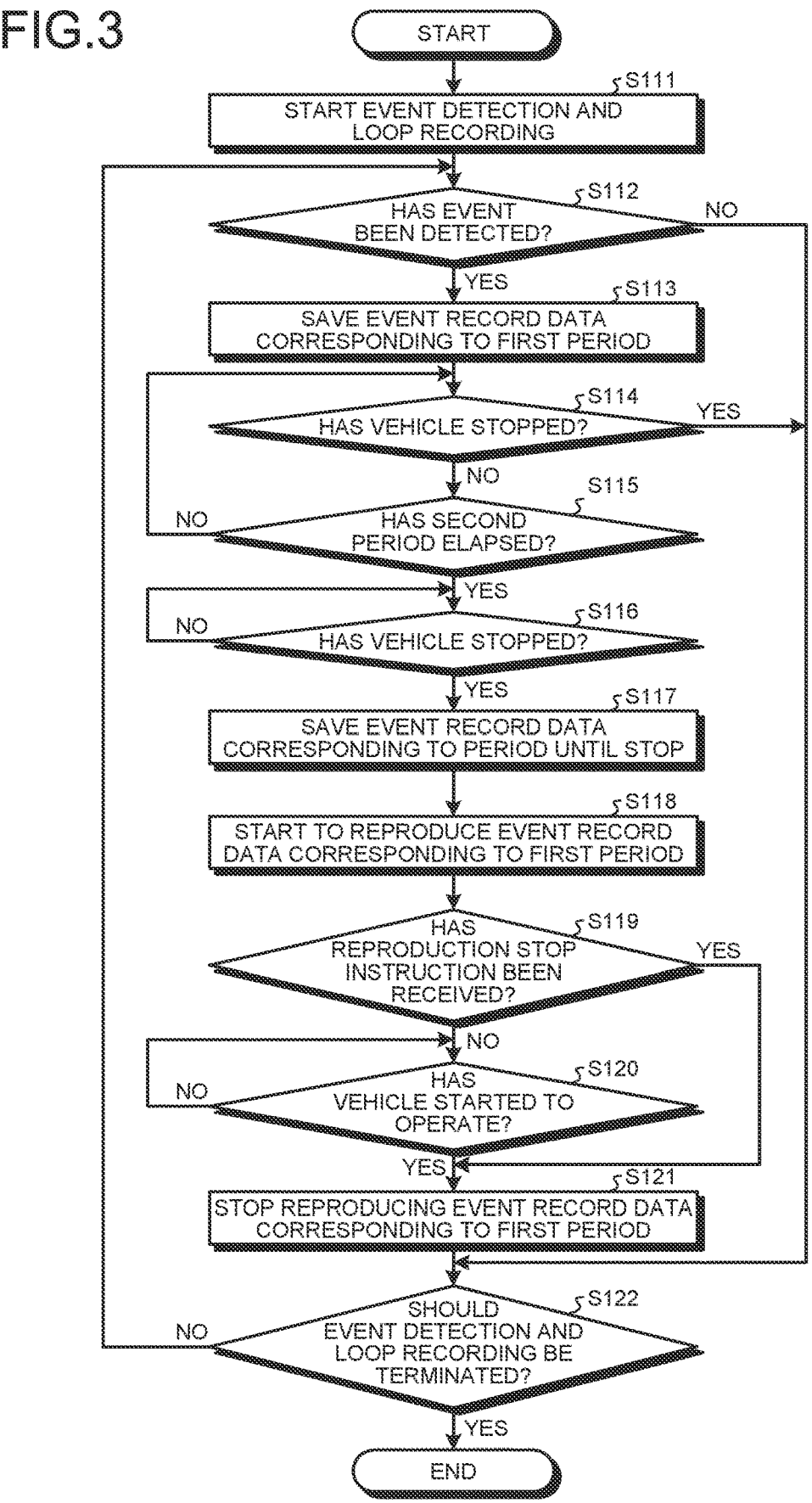
FIG. 3 is a flowchart of a flow of processing in a vehicular recording control device according to a second embodiment.

A vehicular capturing apparatus 10 according to the present embodiment will be described with reference to FIG. 3. FIG. 3 is a flowchart of a flow of processing in a vehicular recording control device according to a second embodiment. The vehicular capturing apparatus 10 is similar in basic configuration to the vehicular capturing apparatus 10 according to the first embodiment. In the following description, constituent elements similar to those in the vehicular capturing apparatus 10 according to the first embodiment are denoted with the same reference signs or corresponding reference signs, and thus the detailed descriptions thereof will be omitted. The vehicular capturing apparatus 10 is different from that according to the first embodiment in terms of processing in a reproduction control unit 124.

The reproduction control unit 124 reproduces event record data saved by a recording control unit 123. According to the present embodiment, in a case where no stop of the vehicle is detected by a stop detection unit 129 in a second period after detection of an event, the reproduction control unit 124 reproduces the event record data in response to a stop of the vehicle after the second period elapses. Reproduction of the event record data at the time of a stop of the vehicle enables reduction of the risk of a secondary event due to reproduction in traveling.

The reproduction control unit 124 reproduces, without any change, the event record data saved by the recording control unit 123. That is, in a case where the saved event record data is event record data based on capture data due to a first camera 210, the event record data based on the capture data due to the first camera 210 is reproduced. Similarly, in a case where the saved event record data is event record data based on capture data due to the first camera 210 and a second camera 220, the event record data based on the capture data due to the first camera 210 and the second camera 220 is reproduced.

In a case where no stop of the vehicle is detected by the stop detection unit 129 in the second period after detection of an event, the reproduction control unit 124 may reproduce the event record data in response to a stop of the vehicle after the second period elapses.

Next, a flow of processing in the vehicular recording control device 100 will be described with FIG. 3. The processing from Step S111 to Step S117 and the processing in Step S122 are similar, respectively, to the processing from Step S101 to Step S107 and the processing in Step S108 in the flowchart illustrated in FIG. 2.

The reproduction control unit 124 in the vehicular recording control device 100 starts to reproduce the event record data corresponding to the first period (Step S118). The vehicular recording control device 100 proceeds to Step S119.

The vehicular recording control device 100 determines whether or not an operation control unit 125 has detected a reproduction stop operation (Step S119). In a case where it is determined that the operation control unit 125 has detected the reproduction stop operation (Yes in Step S119), the vehicular recording control device 100 proceeds to Step S121. In this case, for example, in a case where the driver recognizes that no event has occurred actually because acceleration having caused determination of detection of an event was caused at the time of getting over a step, a reproduction stop operation enables a stop in reproduction. In a case where it is determined that the operation control unit 125 has detected no reproduction stop operation (No in Step S119), the vehicular recording control device 100 proceeds to Step S120.

The vehicular recording control device 100 determines whether the vehicle has started to operate (Step S120). More specifically, in a case where it is determined that the vehicle has started to operate (Yes in Step S120), the vehicular recording control device 100 proceeds to Step S121. In a case where it is determined that the vehicle has not started to operate (No in Step S120), the vehicular recording control device 100 performs the processing in Step S120, again.

The vehicular recording control device 100 stops reproducing the event record data corresponding to the first period (Step S121). The vehicular recording control device 100 proceeds to Step S122.

As above, in a case where no stop of the vehicle is detected in the second period after detection of an event, event record data is reproduced in response to a stop of the vehicle after the second period elapses.

As described above, according to the present embodiment, in a case where no stop of the vehicle is detected in the second period after detection of an event, event record data can be reproduced in response to a stop of the vehicle after the second period elapses. According to the present embodiment, in a case where no stop of the vehicle is detected in the second period after detection of an event, event record data based on capture data corresponding to the first period can be reproduced in response to a stop of the vehicle after the second period elapses. Thus, according to the present embodiment, in a case where the driver has not noticed occurrence of an event, capture data centering on the time of detection of the event is reproduced as event record data, assisting the driver in noticing the occurrence of the event.

According to the present embodiment, for example, in a case where the driver recognizes that no event has occurred actually because acceleration having caused determination of detection of an event was caused at the time of getting over a step, a reproduction stop operation enables a stop in reproduction.

Third Embodiment

Figure 4:
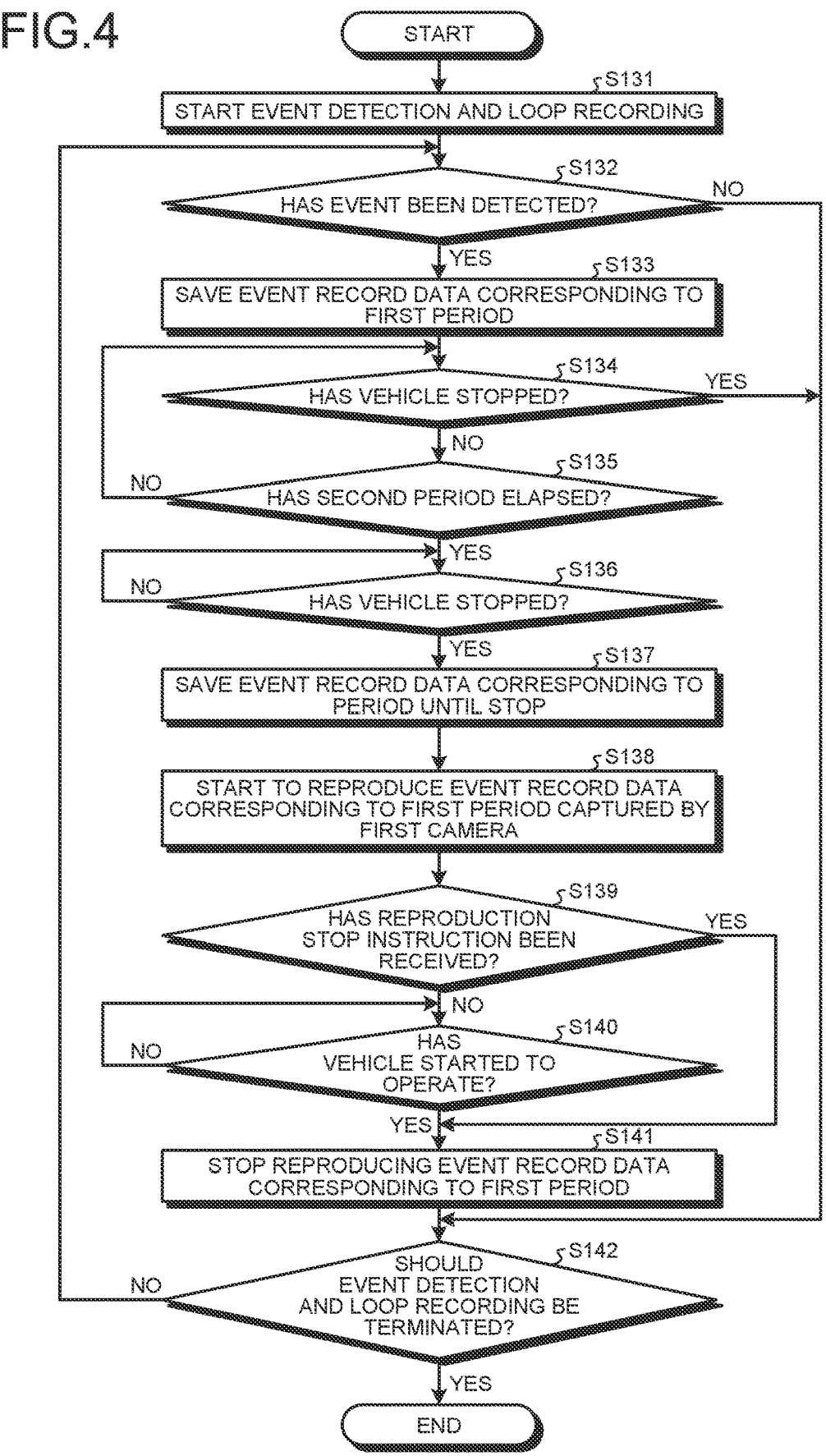
FIG. 4 is a flowchart of a flow of processing in a vehicular recording control device according to a third embodiment.

A vehicular capturing apparatus 10 according to the present embodiment will be described with reference to FIG. 4. FIG. 4 is a flowchart of a flow of processing in a vehicular recording control device according to the third embodiment. The vehicular capturing apparatus 10 is similar in basic configuration to the vehicular capturing apparatus 10 according to the first embodiment. In the following description, constituent elements similar to those in the vehicular capturing apparatus 10 according to the first embodiment are denoted with the same reference signs or corresponding reference signs, and thus the detailed descriptions thereof will be omitted. The vehicular capturing apparatus 10 is different from that according to the first embodiment in terms of processing in a reproduction control unit 124.

In a case where no stop of the vehicle is detected by a stop detection unit 129 in a second period after detection of an event, the reproduction control unit 124 reproduces event record data based on capture data captured by a first camera 210, in response to a stop of the vehicle after the second period elapses. In a case where no stop of the vehicle is detected by the stop detection unit 129 in the second period after detection of an event, the reproduction control unit 124 reproduces event record data based on capture data corresponding to a first period, in response to a stop of the vehicle after the second period elapses. More specifically, even in a case where event record data to be reproduced is event record data including the capture data captured by the first camera 210 and capture data captured by a second camera 220, the reproduction control unit 124 reproduces the capture data captured by the first camera 210 in the event record data. In other words, the reproduction control unit 124 reproduces capture data including the captured vicinity of the vehicle, from the event record data.

Next, a flow of processing in the vehicular recording control device 100 will be described with FIG. 4. The processing from Step S131 to Step S137 and the processing in Step S142 are similar, respectively, to the processing from Step S101 to Step S107 and the processing in Step S108 in the flowchart illustrated in FIG. 2. The processing from Step S139 to Step S141 is similar to the processing from Step S119 to Step S121 in the flowchart illustrated in FIG. 3.

The reproduction control unit 124 in the vehicular recording control device 100 starts to reproduce the event record data corresponding to the first period, captured by the first camera 210 (Step S138). The vehicular recording control device 100 proceeds to Step S139.

As above, in a case where no stop of the vehicle is detected in the second period after detection of an event, event record data based on capture data corresponding to the first period captured by the first camera 210 is reproduced in response to a stop of the vehicle after the second period elapses.

As described above, according to the present embodiment, in a case where no stop of the vehicle is detected in the second period after detection of an event, event record data based on capture data corresponding to the first period captured by the first camera 210 can be reproduced in response to a stop of the vehicle after the second period elapses. Thus, according to the present embodiment, in a case where the driver has not noticed occurrence of an event, capture data captured by the first camera 210 before and after detection of the event is reproduced as event record data, assisting the driver in noticing the occurrence of the event.

The vehicular capturing apparatus 10 according to the present embodiment has been described above. The vehicular capturing apparatus 10 may be achieved in various different modes, in addition to the embodiments described above.

Each constituent element in the vehicular capturing apparatus 10 illustrated is conceptual in function, and thus is not necessarily provided physically as illustrated. That is, each device is not limited in specific mode to the illustration. In accordance with the processing load or usage condition of each device, the entirety or part thereof may be functionally or physically distributed or integrated in any appropriate unit.

The vehicular capturing apparatus 10 is achieved in configuration, for example, by a program loaded in a memory as software. In the embodiments, functional blocks that are achieved in cooperation between hardware and software have been given. That is, the functional blocks can be achieved in various forms by only hardware, only software, or a combination thereof.

The constituent elements above include constituent elements that a person skilled in the art can easily conceive and substantially the same constituent elements. Furthermore, the configurations above can be appropriately combined. Moreover, various omissions, replacements, or alternations can be made in configuration without departing from the scope of the gist of the present embodiment.

The case of loop recording processing has been given above. The same applies to processing in a case where capturing starts after detection of an event.

Two cameras capable of forward capturing and backward capturing, respectively, have been given above, but this is not limitative. Thus, provided may be a camera capable of 360°-omnidirectional capturing or a plurality of cameras that each captures a direction. In a case where provided is a camera capable of omnidirectional capturing, displayed may be capture data extracted in a display range corresponding to the rear side in the travel direction of the vehicle.

The following description has been given above: in a case where no stop of the vehicle is detected in the second period after detection of an event, event record data is reproduced in response to a stop of the vehicle after the second period elapses. However, a notification that an event has occurred may be issued by voice.

For example, capture data corresponding to the period until the stop detection unit 129 detects a stop of the vehicle may be transferred to an external device such that the capture data is prevented from being deleted by a user.

After Step S106 is performed but before Step S107 is performed, performed may be a step of determining whether or not the acceleration detected at the time of detection of the event is not more than a second threshold smaller than the threshold used in determination of detection of an event in the event detection unit 127. In a case where the acceleration detected at the time of detection of the event is not more than the second threshold, in other words, in a case where the acceleration detected at the time of detection of the event resulted from a slight minor collision and the occurrence of the event is unlikely to be noticed, the processing in Step S107 is performed. In a case where the acceleration detected at the time of detection of the event is larger than the second threshold, in other words, in a case where the acceleration detected at the time of detection of the event is large and the occurrence of the event is likely to be noticed, for example, a report may be issued to a third party, such as a police station or an insurance company.

INDUSTRIAL APPLICABILITY

A vehicular recording control device, a vehicular capturing apparatus, a vehicular recording control method, and a program according to the present embodiment can be utilized for a vehicular capturing apparatus, such as a dashboard camera.

According to the present embodiment, achieved is an effect of enabling proper recording of an image at the time of occurrence of an event.

What is claimed is:

1. A vehicular recording control device comprising:
a capture-data acquisition unit configured to acquire capture data captured by a first capturing unit that captures a vicinity of a vehicle;
an event detection unit configured to detect an event to the vehicle;
a stop detection unit configured to detect a stop of the vehicle after the event detection unit detects the event;
a recording control unit configured to record the capture data as overwriting-allowed capture data by loop-recording in which old capture data is overwritten with new capture data and recorded, save, in a case where the event is detected by the event detection unit, as no-overwriting-allowed event record data, at least first capture data of the capture data corresponding to a first period resulting from the detection of the event, the recording control unit being configured to save, in a case where no stop of the vehicle is detected by the stop detection unit in a second period after the detection of the event, as the event record data, second capture data of the capture data corresponding to a period until the stop detection unit detects the stop of the vehicle, in addition to the first capture data corresponding to the first period; and
a capture-data processing unit configured to generate the capture data of a certain period as a file from the capture data recorded by the loop-recording, wherein
the second period is set to be a predetermined period of time, set in accordance with a state of a driver of the vehicle, or set in accordance with a condition at a time of driving of the vehicle,
the capture-data processing unit is further configured to generate, as the event record data, at least the capture data corresponding to the first period including a point in time of occurrence of the event, from the capture data recorded by the loop-recording.

2. The vehicular recording control device according to claim 1, wherein
the capture-data acquisition unit further acquires third capture data captured by a second capturing unit that captures a range including a driver of the vehicle, and
the recording control unit saves, as the event record data, the third capture data captured by the second capturing unit and fourth capture data of the capture data captured by the first capturing unit both at least corresponding to a third period from the detection of the event by the event detection unit until the detection of the stop of the vehicle by the stop detection unit.

3. The vehicular recording control device according to claim 2, wherein the recording control unit saves the first capture data corresponding to the first period, and the third capture data and the fourth capture data corresponding to the third period, as continuous event record data.

4. The vehicular recording control device according to claim 1, further comprising a reproduction control unit, wherein, in the case where no stop of the vehicle is detected by the stop detection unit in the second period after the detection of the event, the reproduction control unit reproduces the event record data based on the capture data captured by the first capturing unit, in response to the stop of the vehicle after the second period elapses.

5. The vehicular recording control device according to claim 1, further comprising a reproduction control unit, wherein, in the case where no stop of the vehicle is detected by the stop detection unit in the second period after the detection of the event, the reproduction control unit reproduces the event record data based on the first capture data of the capture data corresponding to the first period, in response to the stop of the vehicle after the second period elapses.

6. A vehicular capturing apparatus comprising:
the vehicular recording control device according to claim 1;

a first capturing unit configured to capture a vicinity of a vehicle; and a display unit configured to display capture data captured by the first capturing unit.

7. A vehicular recording control method comprising:

a capture-data acquisition step of acquiring capture data captured by a first capturing unit that captures a vicinity of a vehicle;

an event detection step of detecting an event to the vehicle;

a stop detection step of detecting a stop of the vehicle after the event is detected in the event detection step;

a recording control step of recording the capture data as overwriting-allowed capture data by loop-recording in which old capture data is overwritten with new capture data and recorded, saving, in a case where the event is detected in the event detection step, as no-overwriting-allowed event record data, at least first capture data of the capture data corresponding to a first period resulting from the detection of the event, and saving, in a case where no stop of the vehicle is detected in the stop detection step in a second period after the detection of the event, as the event record data, second capture data of the capture data corresponding to a period until the stop of the vehicle is detected in the stop detection step, in addition to the first capture data corresponding to the first period; and a generating step of generating the capture data of a certain period as a file from the capture data recorded by the loop-recording, wherein the second period is set to be a predetermined period of time, set in accordance with a state of a driver of the vehicle, or set in accordance with a condition at a time of driving of the vehicle, the generating further comprises generating, as the event record data, at least the capture data corresponding to the first period including a point in time of occurrence of the event, from the capture data recorded by the loop-recording.

8. A non-transitory computer readable recording medium storing therein a program for causing a computer that operates as a vehicular recording control device, to perform:

a capture-data acquisition step of acquiring capture data captured by a first capturing unit that captures a vicinity of a vehicle;

an event detection step of detecting an event to the vehicle;

a stop detection step of detecting a stop of the vehicle after the event is detected in the event detection step;

a recording control step of recording the capture data as overwriting-allowed capture data by loop-recording in which old capture data is overwritten with new capture data and recorded, saving, in a case where the event is detected in the event detection step, as no-overwriting-allowed event record data, at least first capture data of the capture data corresponding to a first period resulting from the detection of the event, and saving, in a case where no stop of the vehicle is detected in the stop detection step in a second period after the detection of the event, as the event record data, second capture data of the capture data corresponding to a period until the stop of the vehicle is detected in the stop detection step, in addition to the first capture data corresponding to the first period; and a generating step of generating the capture data of a certain period as a file from the capture data recorded by the loop-recording, wherein the second period is set to be a predetermined period of time, set in accordance with a state of a driver of the vehicle, or set in accordance with a condition at a time of driving of the vehicle, the generating step further comprises generating, as the event record data, at least the capture data corresponding to the first period including a point in time of occurrence of the event, from the capture data recorded by the loop-recording.

9. The vehicular recording control device according to claim 1, wherein the event record data of the first period is reproduced after the vehicle stops.

* * * * *